US007545382B1

(12) United States Patent
Montrym et al.

(10) Patent No.: US 7,545,382 B1
(45) Date of Patent: Jun. 9, 2009

(54) APPARATUS, SYSTEM, AND METHOD FOR USING PAGE TABLE ENTRIES IN A GRAPHICS SYSTEM TO PROVIDE STORAGE FORMAT INFORMATION FOR ADDRESS TRANSLATION

(75) Inventors: John S. Montrym, Los Altos Hills, CA (US); David B. Glasco, Austin, TX (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 111 days.

(21) Appl. No.: 11/393,621

(22) Filed: Mar. 29, 2006

(51) Int. Cl.
*G06T 1/60* (2006.01)
(52) U.S. Cl. .................... 345/530; 345/564; 345/565; 345/566; 345/567; 345/568; 345/569; 345/570; 345/571; 345/572; 345/573; 345/574; 382/232; 711/202
(58) Field of Classification Search ................ 345/530, 345/564–574; 711/202; 382/232
See application file for complete search history.

(56) References Cited

U.S. PATENT DOCUMENTS

| 4,755,809 | A | * | 7/1988 | Ikegami et al. ............. 715/785 |
| 5,021,989 | A | * | 6/1991 | Fujisawa et al. ............ 345/661 |
| 5,230,064 | A | * | 7/1993 | Kuo et al. .................. 345/505 |
| 5,438,663 | A | * | 8/1995 | Matsumoto et al. ......... 345/520 |
| 5,699,539 | A | * | 12/1997 | Garber et al. ................. 711/2 |
| 5,754,191 | A | * | 5/1998 | Mills et al. ................. 345/563 |
| 5,809,554 | A | * | 9/1998 | Benayon et al. ............ 711/171 |
| 5,960,465 | A | * | 9/1999 | Adams ...................... 711/208 |
| 6,282,625 | B1 | * | 8/2001 | Porterfield ................. 711/206 |
| 6,516,397 | B2 | * | 2/2003 | Roy et al. .................. 711/170 |
| 6,545,684 | B1 | * | 4/2003 | Dragony et al. ............ 345/531 |
| 6,580,427 | B1 | * | 6/2003 | Orenstein et al. .......... 345/422 |
| 6,697,076 | B1 | * | 2/2004 | Trivedi et al. .............. 345/568 |
| 6,853,382 | B1 | * | 2/2005 | Van Dyke et al. .......... 345/544 |
| 6,999,088 | B1 | * | 2/2006 | Van Dyke et al. .......... 345/544 |
| 7,047,382 | B2 | * | 5/2006 | Geiger et al. ............... 711/165 |
| 7,102,646 | B1 | * | 9/2006 | Rubinstein et al. ......... 345/570 |
| 7,188,227 | B2 | * | 3/2007 | Luick ........................ 711/172 |
| 7,286,134 | B1 | * | 10/2007 | Van Dyke et al. .......... 345/544 |
| 2002/0073298 | A1 | * | 6/2002 | Geiger et al. ............... 711/206 |
| 2002/0118202 | A1 | * | 8/2002 | Baldwin .................... 345/530 |
| 2002/0145610 | A1 | * | 10/2002 | Barilovits et al. .......... 345/538 |
| 2004/0160449 | A1 | * | 8/2004 | Gossalia et al. ............ 345/543 |
| 2005/0071579 | A1 | * | 3/2005 | Luick ........................ 711/154 |
| 2007/0028075 | A1 | * | 2/2007 | Holder et al. .............. 711/210 |

* cited by examiner

*Primary Examiner*—Kimbinh T Nguyen
(74) *Attorney, Agent, or Firm*—Cooley Godward Kronish LLP

(57) ABSTRACT

A graphics system utilizes page table entries to provide information on the storage format used to store graphics data. The page table entries, in turn, may be used for address translation. Exemplary kinds of storage format information include compression mode, a packing mode for storing Z data in tiles or color data in tiles, and a mode for allocating tile data among partitions in a partitioned memory.

14 Claims, 10 Drawing Sheets

APPARATUS, SYSTEM, AND METHOD FOR USING PAGE TABLE ENTRIES IN A GRAPHICS SYSTEM TO PROVIDE STORAGE FORMAT INFORMATION FOR ADDRESS TRANSLATION

FIELD OF THE INVENTION

The present invention is generally related to graphics memory technology. More particularly, the present invention is directed towards the use of page table entries in a graphics system to provide information for performing an address translation of graphics data that may be stored in different storage formats.

BACKGROUND OF THE INVENTION

Graphics systems generate graphics data for a graphical surface and store the resultant data in a graphics memory, such as a dynamic random access memory (DRAM) system. In many graphics systems, data is generated and stored for localized regions of the graphical surface as tiles. An address translation is performed to convert from the (x, y) or (x, y, z) coordinates of a particular region of the graphical surface to a memory address. The address translation is performed as a chain of translations. First, an (x, y) or (x, y, z) surface coordinate is translated to a virtual memory address. Second, the virtual address is translated to a physical memory address. Third, the physical memory address is translated to the raw DRAM address which comprises columns, banks, rows, and partition numbers.

Conventionally a pitch formula is used to map surface coordinates to a virtual address. The pitch formula translates multidimensional spatial coordinates to a one dimensional memory address. A typical pitch formula is VA=y*pitch+ x*size_of_pixel, where VA is the virtual address, x and y are surface coordinates of the graphics surface, size_of_pixel is the size of the pixel, and the pitch is a constant.

Referring to FIG. 1, conventionally a tile remapping table is used to map the virtual address determined by the pitch formula to tiled memory regions. For example, virtual addresses within specified byte ranges are mapped to bytes within a particular tile 110-1 of a group of tiles 110-1, 110-2, 110-3, 110-4, 110-5, and 110-6. An individual tile, such as tile 110-1, may have bytes mapped sequentially through rows of the tile, such as along rows for bytes 0 to 4K−1.

Referring to FIG. 2, in the prior art, a 1:1 mapping is performed between the virtual addresses defined by the pitch formula to raw addresses used to access DRAM memory. Regions are defined with respect to minimum and maximum address pairs ("min/max pairs") within the virtual address space. Based on the min/max pairs, a lookup is performed to a region table stored in hardware registers. The region table assigned to the min/max pair provides information for translating from the virtual addresses to raw DRAM addresses. For example, the region table may include information on whether the data was compressed.

One drawback of the prior art is that it provides only a limited capability to define lookup attributes. In particular, each region table requires hardware registers. The number of hardware registers that may be utilized for address translation is limited by various considerations, including hardware costs. Consequently, the number of different region tables that can be supported is a fixed, limited number. However, modern graphics systems increasingly employ a wide range of data compression and formatting modes. As a result, prior art address translation techniques limit the ability of a graphics system to utilize a large number of surfaces with different compression and data formats.

In light of the above-described problems the need arose for the apparatus, system, and method of the present invention.

SUMMARY OF THE INVENTION

A graphics system stores information describing a memory storage format as an entry in a page table. The page table entries provide information that may be used in address translation. In one embodiment a page table entry is a descriptor that provides information on the organization of raw graphic data for use in performing address translation between a physical address and a raw address.

One embodiment of a graphics apparatus includes a graphics processing unit (GPU) for processing commands for generating a graphics surface. A graphics memory system is adapted to store graphics data for a region of the graphics surface as one or more tiles. The graphics apparatus is configured to utilize page table entries describing the kind of storage format used to store the data. The page table entries may be used to perform address translation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
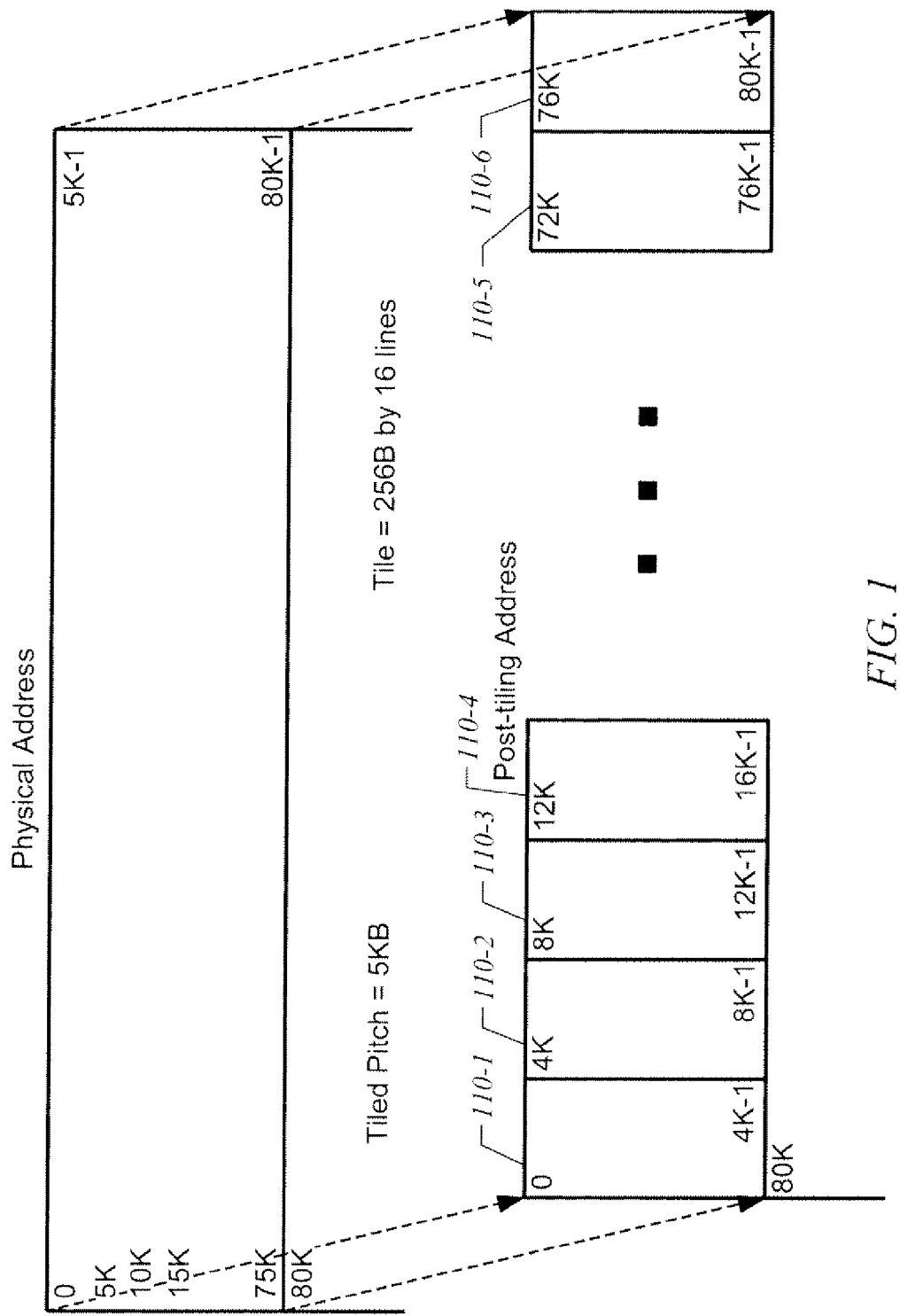
FIG. 1 illustrates a tile remapping utilized in a prior art address translation technique based on a pitch formula.
Figure 2:
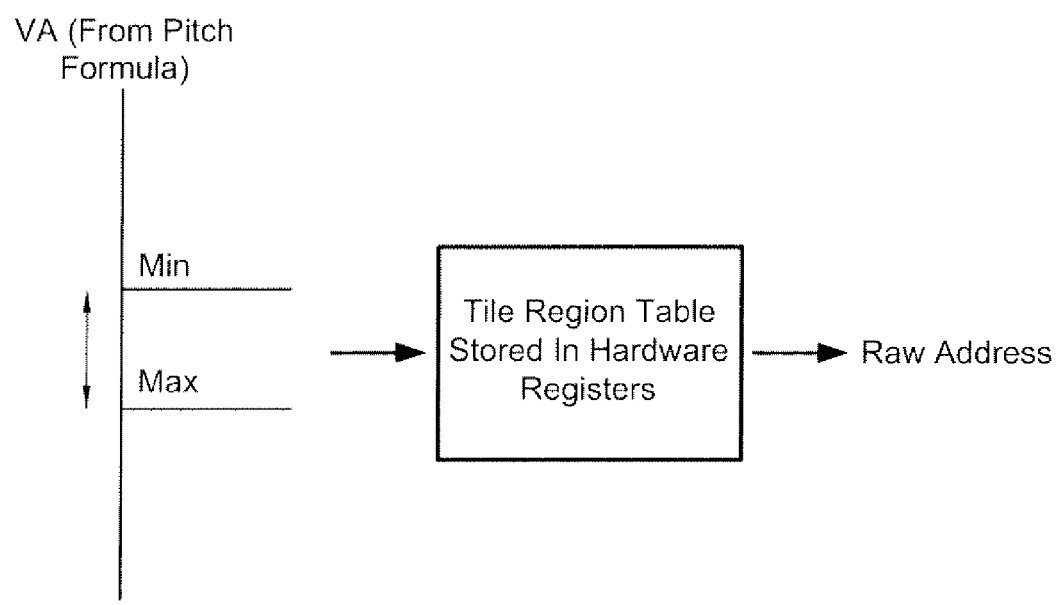
FIG. 2 illustrates region tables utilized to perform address translation to raw addresses in accordance with the prior art.
Figure 3A:
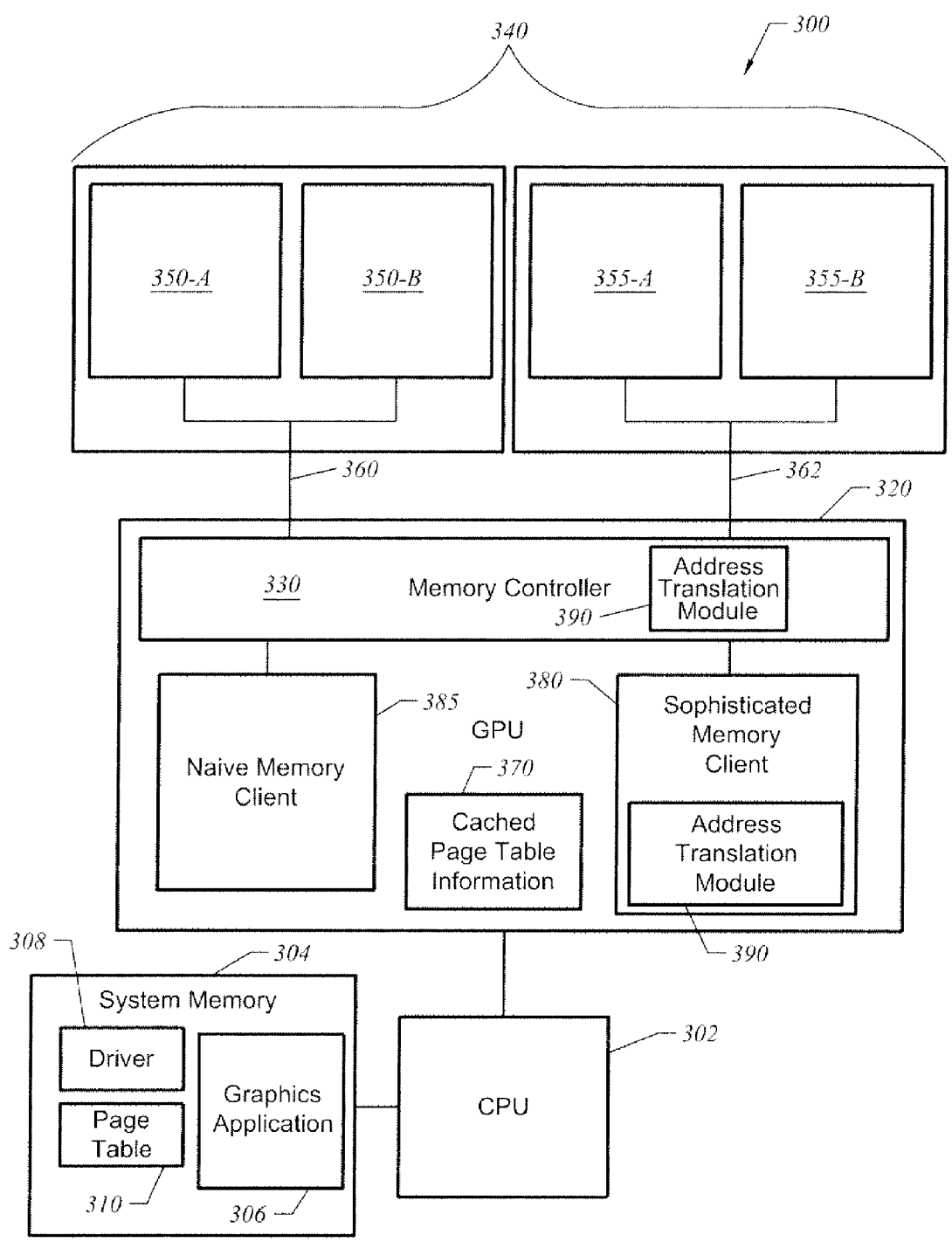
FIG. 3A illustrates a graphics system utilizing page tables to perform address translation of graphics data stored in different storage formats in accordance with one embodiment of the present invention.

FIG. 3A is a block diagram illustrating a graphics system 300 in accordance with one embodiment of the present invention. A central processing unit 302 has an associated system memory 304 including a graphics application 306, driver 308, and a page table 310. As graphics application 306 executes on CPU 302, it works with driver 308 to issue commands for generating graphical surfaces. As described below in more detail, a page table 310 is generated that includes pages having page table entries providing descriptors of the memory storage formats used to store graphics data. The descriptors in the page table entries may be used in translating physical addresses to raw memory addresses. Consequently, the present invention is compatible with computer systems using page tables for address translation.

A graphics processing unit (GPU) 320 is coupled to CPU 302 by, for example, a bus, bridge, or other suitable interface. GPU 320 may, for example, employ a graphics pipeline (not shown) to generate graphics data. A memory controller 330 is provided in GPU 320 to access a graphics memory, such as a dynamic random access memory (DRAM) memory system 340.

The graphics system 300 supports the storage of graphics data as tiles. An individual tile preferably corresponds to a contiguous region of byte addresses on a single DRAM page to improve memory transfer efficiency. That is, the tiled graphics memory is preferably organized to improve memory coherency by storing a tile in a region of memory that can be accessed with a small number of data transfers from a range of contiguous memory addresses that can be efficiently accessed.

In a partitioned memory system the memory may be organized into individual partitions 350-A, 350-B, 355-A, and 355-B. Bus 360 may, for example, access both partitions 350-A and 350-B. Bus 362 may access partitions 355-A and 355-B. In a partitioned memory, tile data may be allocated across individual partitions, such as across partitions 350-A and 350-B. As an illustrative example, a tile may have individual data sections assigned to different partitions, where each section corresponds to a portion of the bytes in the tile. Different partition stride modes, such as 256 bytes and 1024-bytes, may be supported for modes in which tile data is allocated across individual partitions. Consequently, in one embodiment a storage format includes a partition stride mode indicating how tile data is allocated between two or more partitions. Background information on partitioned graphics memory technology is described in copending U.S. patent application Ser. Nos. 10/746,320 and 10/740,229, the contents of which are hereby incorporated by reference. Additional background information on partitioned graphics memory technology is also described in U.S. Pat. No. 6,853,382, the contents of which is hereby incorporated by reference.

In one embodiment GPU 320 includes a local cache 370 for caching the descriptors of the storage format from the page table entries. Local cache 370 may, for example, be implemented as a translation look-aside buffer that stores a cache of page table entries recently used for translating between physical addresses and raw addresses.

Individual clients, such as a sophisticated client 380, may include an address translation module 390 for performing address translation utilizing the page table entries to permit the sophisticated client 380 to refer to data using raw addresses. Alternately a naïve client 385 may refer to memory addresses using a virtual address and let another component having an address translation module, such as memory controller 330, perform address translation.

In one embodiment, graphics system 300 supports a plurality of different tile storage formats for storing graphics data in DRAM memory system 340. The different tile formats may, for example, be optimized to support the storage and/or utilization of different types of graphics data.

Figure 3B:
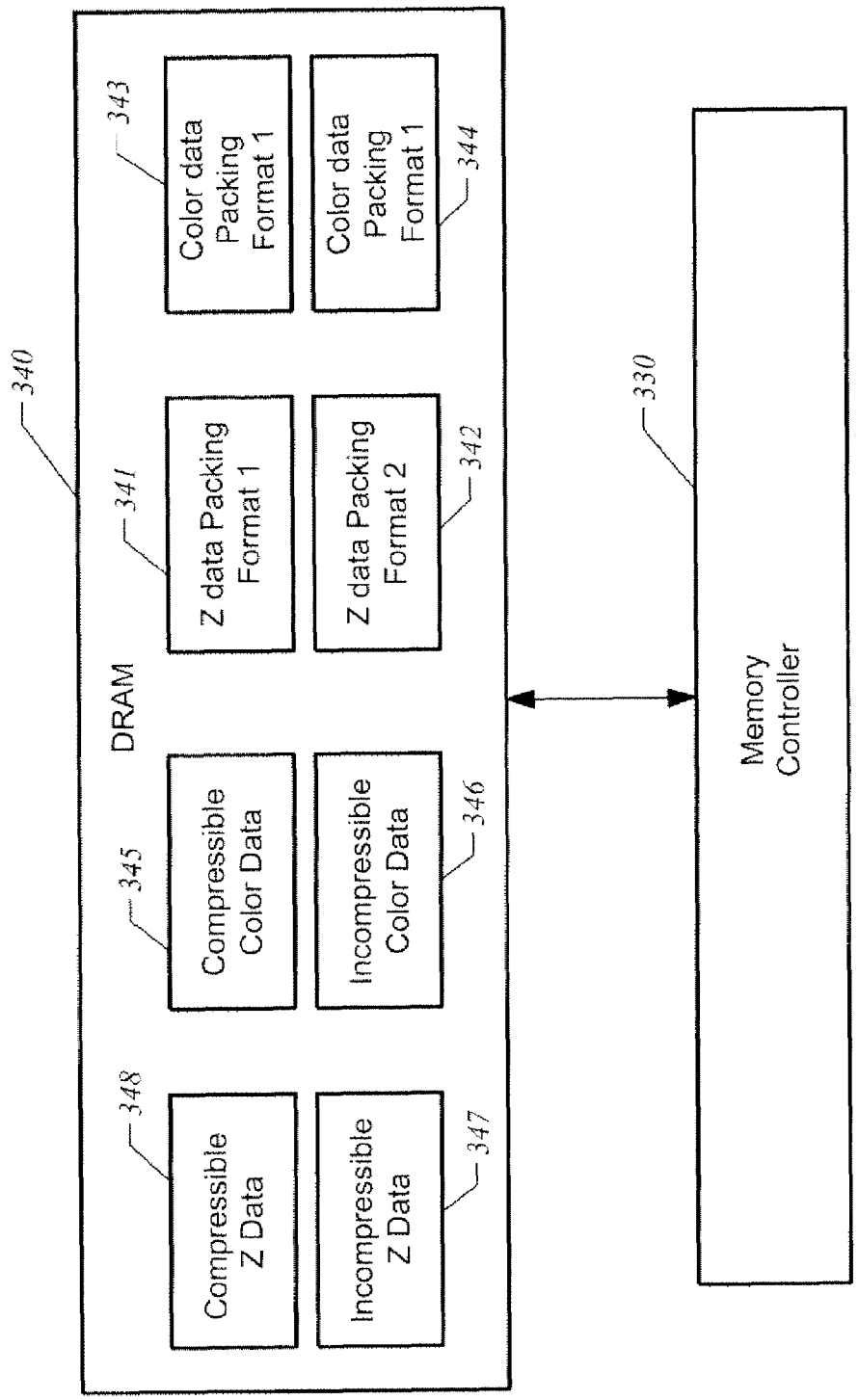
FIG. 3B illustrates tile data formats for the system of FIG. 3A in accordance with one embodiment of the present invention.

FIG. 3B illustrates different types of tiles stored in an exemplary DRAM memory, such as in one of the partitions 350-A, 350-B, 355-A, or 355-B. In a tiled graphics system different tile types may be supported. For example, a particular tile format type may support storing one or more types of data in a selected packing mode, where the packed mode specifies a format for the type of data stored in the tile, the size of the tile, the number of lines in the tile, the number of bytes per line, and the organization of bytes of data within the tile. For example, Z data may be stored in different packing formats 341 and 342. Similarly, color data may be stored in different packing formats 343 and 344. More generally, the storage format may, for example, specify the number of bits used to store a particular type of data; the tile format and organization of data within a tile; whether data swizzling is performed; anti-aliasing attributes, fixed-point or floating point data representation, and access privileges.

Graphics data may also be compressible or incompressible. For example compressible Z data 348 or incompressible Z data 347 may be stored. Similarly, compressible color data 345 or incompressible color data 346 may be stored. Consequently, a memory format may also specify a compression mode for a tile. For example, Z data or color data may be compressed and stored in a tile. However, depending upon the implementation, some types of data may be incompressible. Note that in the most general case that a variety of compression modes may be supported to correspond to storage of uncompressed graphics data and one or more different types of data compression. As an illustrative example, a raster operations (ROP) tile for storing 24 bit Z data and 8 bit stencil may be implemented as a 32 byte×4 line region of memory for storing Z and stencil data for 32 pixels. In one embodiment the ROP tile may be stored compressed or uncompressed. Additionally the Z and stencil data within the tile may be re-arranged into contiguous bytes of Z data and contiguous bytes of stencil data to reduce the number of data transfers required for Z-only or Stencil-only rendering modes. As another example color data may be stored in a tile format with the arrangement of bytes in different lines of the tile depending upon the number of bits allocated for color data. Other examples of tile formats specific to storing Z data and color data are described in the copending U.S. patent application Ser. No. 10/740,229 by the assignee of record of the present application, the contents of which are hereby incorporated by reference.

Figure 4:
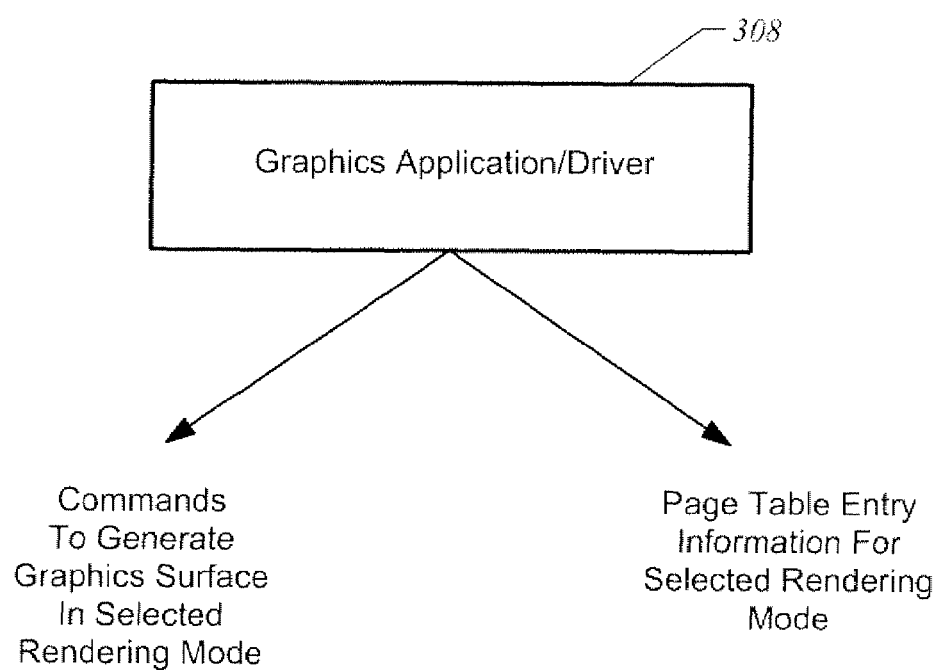
FIG. 4 illustrates the initial generation of a page table entry in accordance with one embodiment of the present invention.

FIG. 4 illustrates an example of how page tables may be initially generated according to one embodiment. Graphics driver 308 generates commands to generate graphics surfaces. Page tables are generated for performing address translation for the graphics surfaces. For example, in a particular rendering mode graphics driver 308 may generate information indicative of the rendering mode that may be used, in part, to generate page table entries. The page table entries may also be updated by CPU 302 or GPU 320. It will also be understood that GPU 320 may also generate a page table entry.

Figure 5:
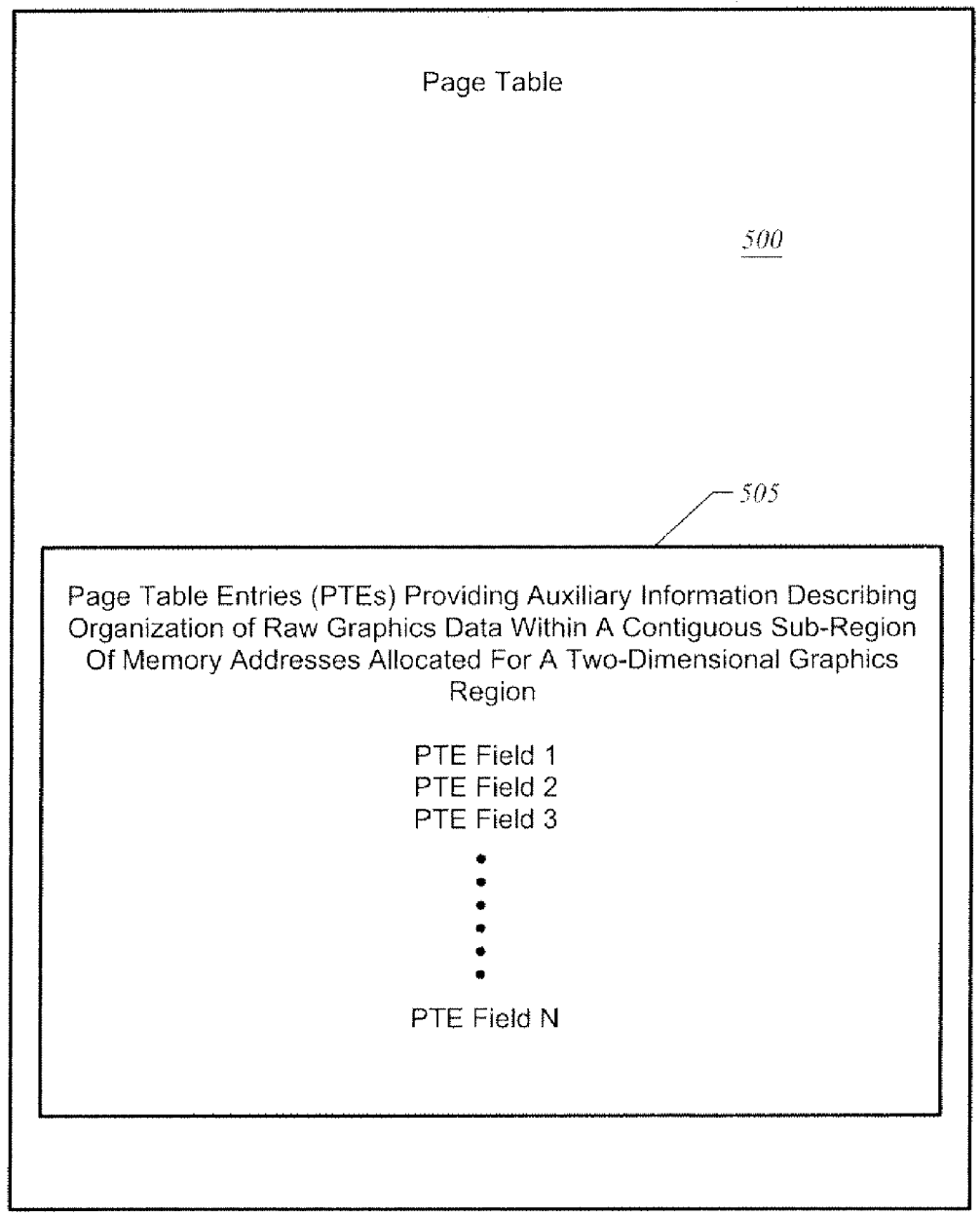
FIG. 5 illustrates an exemplary entry of a page table in accordance with one embodiment of the present invention.

FIG. 5 illustrates an exemplary page table 500. An individual page table has one or more page table entries (PTEs) 505. At least one page table entry is used as a descriptor for mapping physical memory addresses to raw DRAM addresses. In particular, an individual PTE provides auxiliary information describing the organization of raw graphics data in memory. In one embodiment, an arbitrary number, N, of different types of PTE fields are supported, each specifying different storage attributes.

In one embodiment, a PTE entry includes one or more fields that act as descriptors of the storage format. For example, a first data field may be used to specify a packing mode used to store either Z data or color data. Additional fields may be used to specify other attributes, such as a multi-sampling format, swizzle format, compression mode, and partition stride mode. The compression mode specifies compression type information describing a compression attribute of the data. In one embodiment, a compression mode specifies whether the data is compressible or incompressible. Note that in some embodiments more than one tile format is provided each for Z data and color data. Table 1 includes an exemplary list of storage format fields.

TABLE 1

Exemplary Page Table Entry Fields

| Storage Format Field | Attributes |
| --- | --- |
| Z24, S8 | Tile format for storing 24 bit Z data and 8 bit stencil data |
| Z only | Tile format for storing 24 bit Z data without stencil |
| Multisample format | Indicates sample count and/or pattern used for anti-aliasing |
| Swizzle format | Indicates a data swizzling performed on tile data to eliminate DRAM bank conflicts |
| Compression Mode | Indicates a compression type, such as whether tile data is compressible or incompressible |
| Partition stride mode | Indicates mode for allocating tile data across partitions |
| Floating Point | Indicates floating point data representation |
| Fixed Point | Indicates fixed point data representation |
| 32 bit color | 32 bit color tile format |
| 64 bit color | 64 bit color tile format |
| 128 bit color | 128 bit color tile format |

Figure 6:
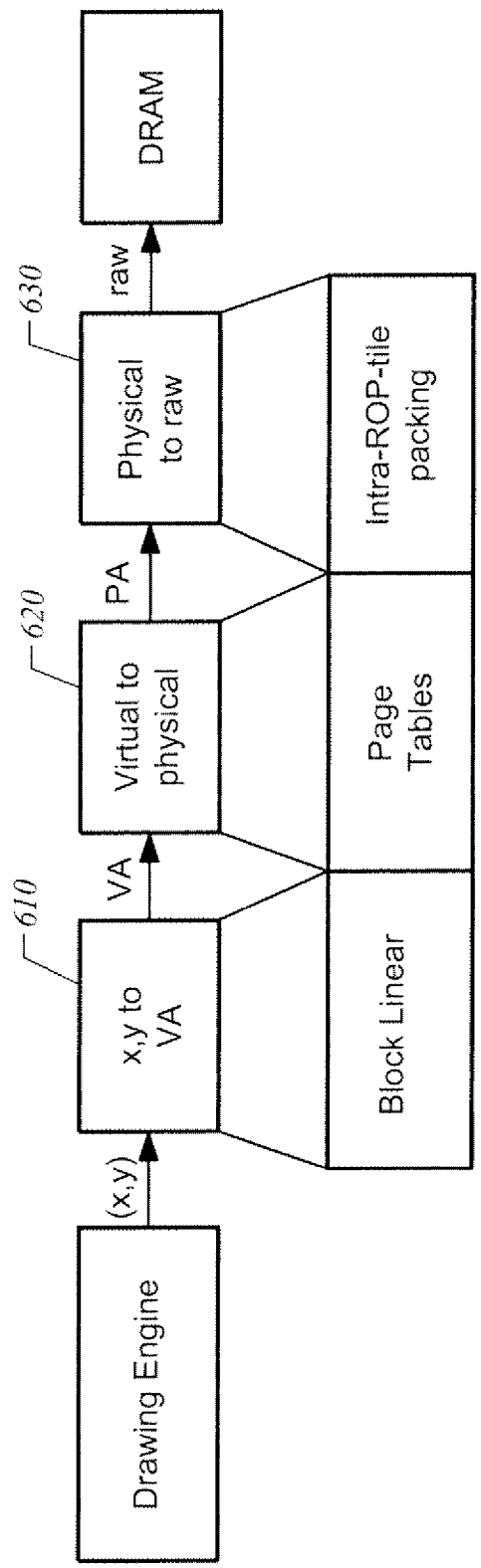
FIG. 6 illustrates an exemplary chain of address translations in accordance with one embodiment of the present invention.

FIG. 6 illustrates an exemplary chain of address translation operations. A region of a graphics surface is generated by a drawing engine and has (x, y, z) coordinates (for the case that graphics surface region is a two dimensional surface, it has (x, y) coordinates). A first address translation 610 is performed to map the graphics surface region to a virtual address space. As described below in more detail, first address translation 610 is preferably performed utilizing a block-linear memory format. Spatial coordinates are mapped to the block-linear memory format to generate virtual addresses. An addressing order may be specified for mapping regions of a graphics surface to the block-linear format. For example, starting with the lowest address, a spatial region may be traversed in a specified order and corresponding locations in the block linear memory format traversed. For example, a mapping order may be defined for traversing addresses in the block linear format according to an order for traversing rows within sub-blocks, through sub-blocks of a block, and from block-to-block. The mapping may be implemented as an algorithm, the details of which will depend on how the block-linear memory format is organized. This mapping of surface coordinates to virtual addresses is used to preserve some of the inherent spatial relationships of the graphics data, improve memory coherency and also eliminates the need for a separate tile remapping. A second address translation 620 is performed to translate the virtual address to a physical address. In one embodiment, the upper bits of the virtual address are used to lookup the page number in the page tables. In this embodiment the lower bits of the virtual address become the lower bits of the physical address. The PTEs on the page table are used in a third translation 630 to translate physical addresses to raw addresses. This third translation may, for example, utilize information in a page table entry specifying how tile data is packed to perform the physical-to-raw address translation.

Figure 7:
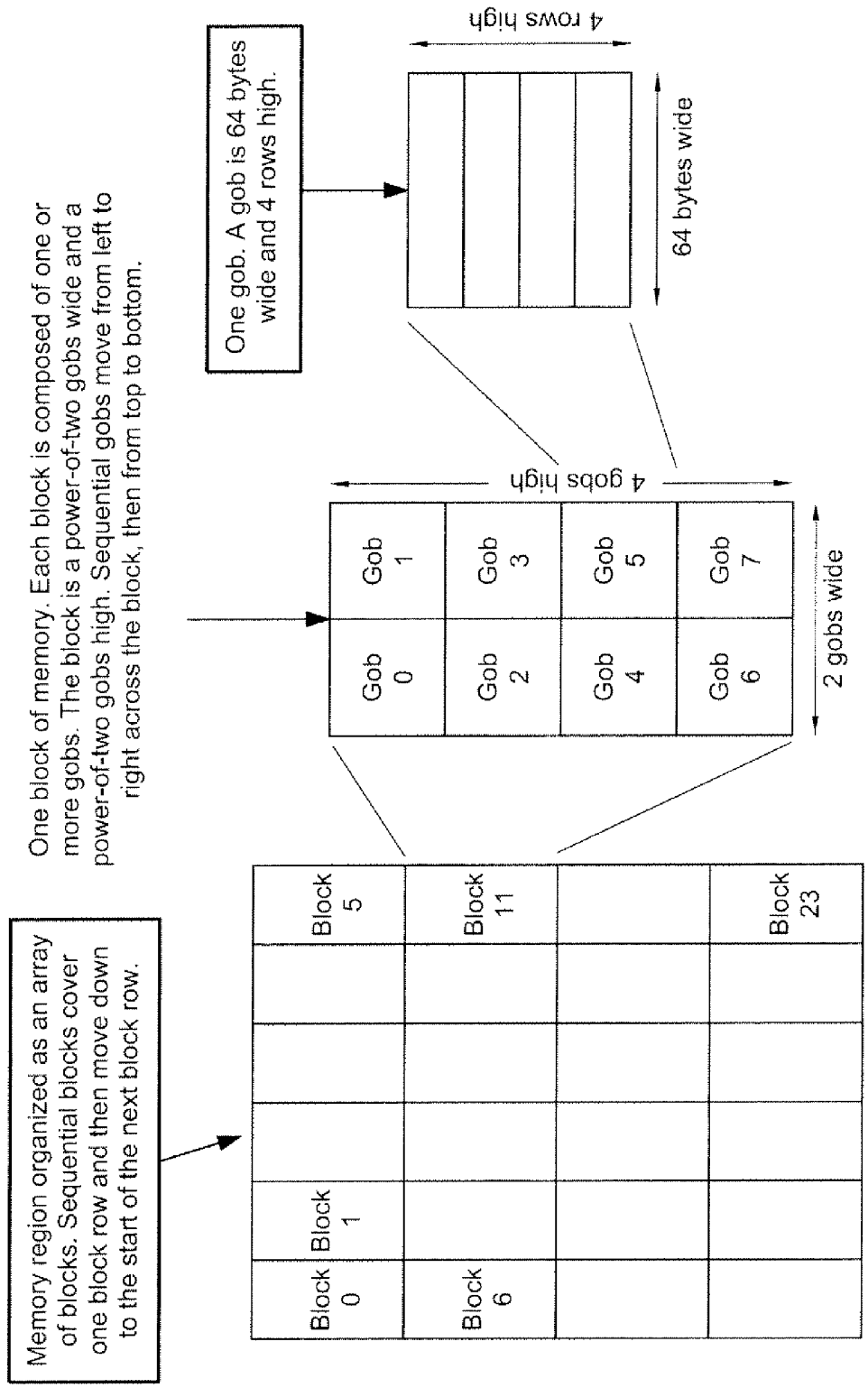
FIG. 7 illustrates an exemplary block-linear memory format in accordance with one embodiment of the present invention.

FIG. 7 illustrates an exemplary block-linear memory format. A memory region is organized as an array of blocks having a sequential block order. An individual block is organized into sub-blocks known as "gobs." As previously described a mapping is performed to map between spatial regions of a graphics surface and corresponding locations in the block-linear memory format. For example, in one embodiment a gob is 64 bytes wide and 4 rows high corresponding to a data size of an individual tile having a data size capable of holding data for a region corresponding to a group of pixels. A two-dimensional surface region is mapped to virtual addresses associated with the block-linear memory format by progressing in a sequential order within rows of a gob (e.g., left-to-right along rows and top-to-bottom down the height of the gob) and then from gob-to-gob until a block is traversed. Then the next block in the sequential block order is mapped. In one embodiment a PTE provides information related to the organization of raw data corresponding to a gob.

Figure 8:
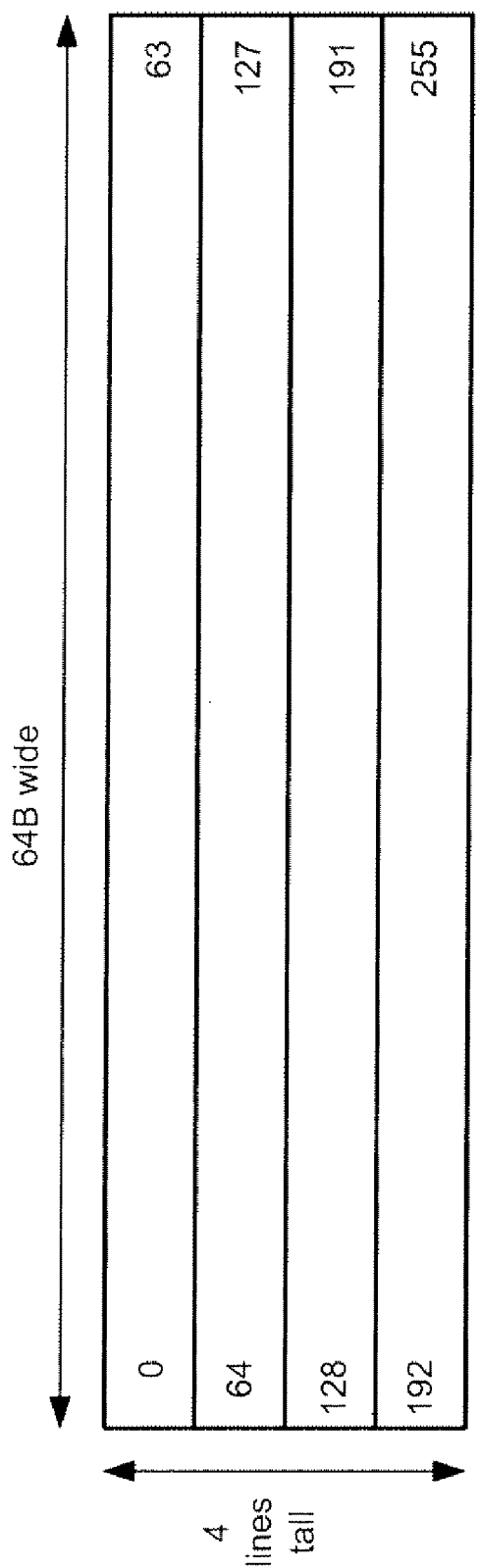
FIG. 8 illustrates an exemplary gob of the block-linear memory format of FIG. 7.

FIG. 8 illustrates in more detail an exemplary gob. In one embodiment a gob is 64 bytes wide and 4 lines tall corresponding to a group of pixels that is 16 pixels wide by 4 pixels high.

Figure 9:
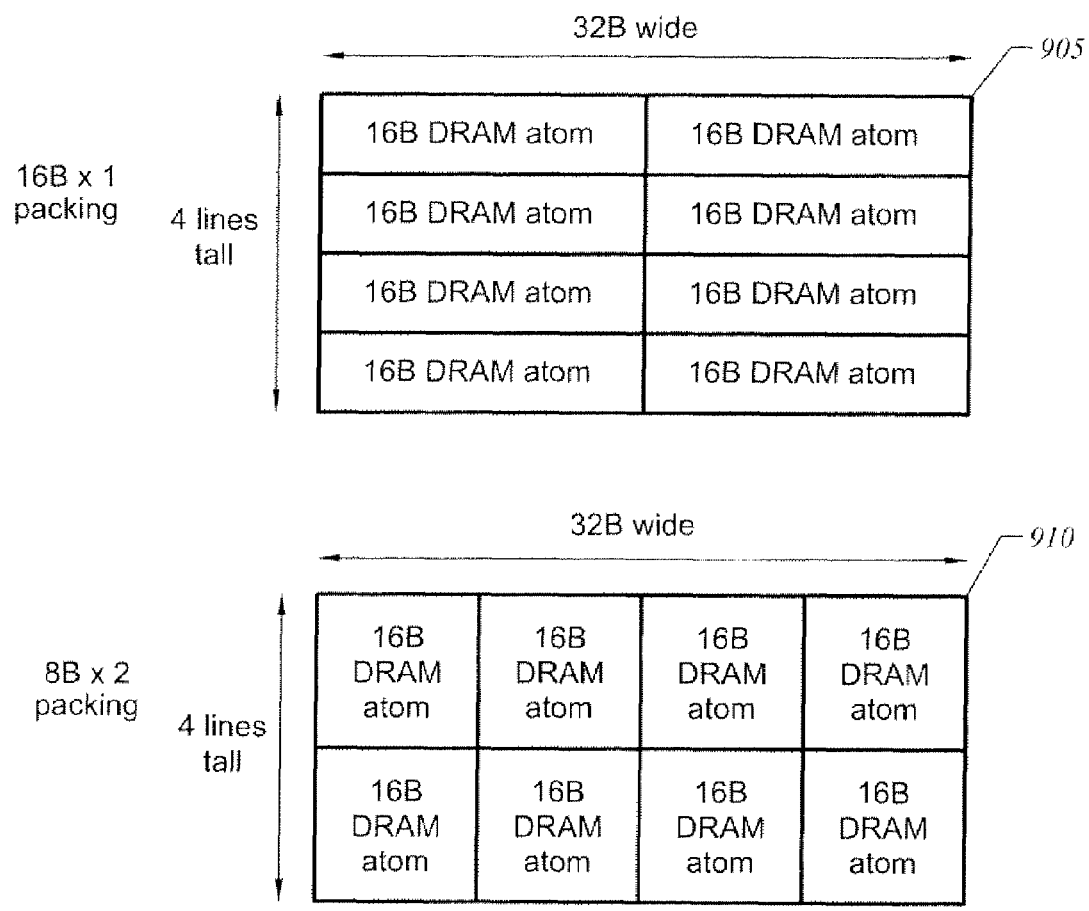
FIG. 9 illustrates exemplary packing modes in accordance with one embodiment of the present invention.

As previously described, a PTE may be used to specify a packing mode for packing graphics data in tiles. FIG. 9 illustrates two exemplary tile packing modes. As one example, a first packing mode 905 may correspond to a 16 Byte×1 packing format and a second packing mode 910 may correspond to a 8 Byte×2 packing format. Note that in these examples there is minimum DRAM memory access size ("DRAM atom") such as 16 Bytes. However, even for a constant DRAM atom size, such as 16B, the packing mode can pack graphics data into tiles in different formats, such as by varying the number of lines used to pack 16 B chunks of data; the organization of data (e.g., combined z and stencil data versus separate z and stencil data); the type of data that is stored; and whether data is packed in a compressible or incompressible format.

One benefit of the present invention is that it permits an architecture in which page tables are used to perform the address translations in a graphics memory. Another benefit is that the use of page tables permits a large number of different storage formats to be used without the need for a large number of hardware registers on the GPU dedicated to storing region tables for performing address translation.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics system, comprising:
   a graphics processing unit (GPU) for processing commands for generating a graphics surface;
   the graphics system having a plurality of different kinds of rendering modes for the GPU wherein each rendering mode has a corresponding different kind of tile storage format defining a tile format and organization of data within the tile with each tile storage format including a packing mode and a compression mode for data stored in the tile;
   a partitioned graphics memory system having a plurality of partitions, the partitioned graphics memory system adapted to store graphics data for a region of said graphics surface utilizing a tile storage format selected from the plurality of different tile storage formats in which each individual tile is stored in one partition, has a data size capable of holding data for a spatial region corresponding to a group of pixels, and spatial regions of pixels are mapped to individual blocks of memory with each block including at least one tile;
   said graphics system configured to utilize page table entries describing the kind of storage format utilized to store said graphics data generated by the GPU for the rendering mode for use by at least one client to perform address translation;
   wherein a set of fields in the page table entries specifies the compression type of each tile, the packing mode for packing graphics data in each tile and a translation of physical addresses to raw addresses corresponding to dynamic random access memory row, column, bank and partition addresses.

2. The graphics system of claim 1, wherein said page table entries specify a mode for storing graphics data in tiles across partitions of a partitioned memory.

3. The graphics system of claim 1, wherein said packing mode specifies a packing mode for storing Z data and stencil data together.

4. The graphics system of claim 1, wherein said packing mode specifies a packing mode for packing Z data.

5. The graphics system of claim 1, wherein said packing mode specifies a packing mode for packing color data.

6. The graphics system of claim 1, wherein said page table entries specify a data swizzling mode used to swizzle tile data.

7. The graphics system of claim 1, wherein said page table entries specify a sample format for performing anti-aliasing.

8. The graphics system of claim 1, wherein coordinates of graphics regions are translated to virtual addresses utilizing a mapping to a block-linear memory format.

9. The graphics system of claim 1, wherein a local cache of said page table entries is maintained in said GPU for use in performing address translation.

10. The graphics system of claim 1, wherein said graphics apparatus includes at least one sophisticated client and at least one naïve client, each naïve client utilizing virtual addresses to access graphics data and each sophisticated client operative to interpret raw addresses utilizing said page table entries.

11. A graphics system, comprising:
    a central processing unit (CPU) and associated graphics driver to issue commands for generating a graphics surface and generate information indicative of a rendering mode to be used to generate the graphics surface;
    a graphics processing unit (GPU) for processing said commands for generating graphics data for said graphics surface;
    the graphics system having a plurality of different kinds of rendering modes for the GPU wherein each rendering mode has a corresponding different kind of tile storage format defining a tile format and organization of data within the tile with each tile storage format including a packing mode and a compression mode for data stored in the tile;
    a partitioned graphics memory system having a plurality of partitions, the partitioned graphics memory system adapted to store graphics data for a region of said graphics surface in a tile utilizing any one of the plurality of different kinds of tile storage formats in which each individual tile is stored in one partition, has a data size capable of holding data for a spatial region corresponding to a group of pixels, and spatial regions of pixels are mapped to individual blocks of memory with each block including at least one tile; and
    at least one memory for storing a page table accessible by at least one client of said graphics system;
    said graphics system configured to utilize page table entries to store descriptors of the kind of storage format utilized to store said graphics data generated by the GPU for the rendering mode in said tile for use by said at least one client to perform address translation;
    wherein a set of fields in the page table entries specifies a compression type of each tile, a packing mode for packing graphics data in each tile and a translation of physical addresses to raw addresses corresponding to dynamic random access memory row, column, bank and partition addresses.

12. The graphics system of claim 11, wherein said descriptors specify the compression type of the graphics data.

13. The graphics system of claim 11, wherein said descriptors specify a mode for storing graphics data in tiles across partitions of a partitioned memory.

14. The graphics system of claim 11, wherein said descriptors specify a packing mode for packing graphics data in tiles.

* * * * *